(12) United States Patent
Jeong

(10) Patent No.: US 11,832,220 B2
(45) Date of Patent: *Nov. 28, 2023

(54) SIDELINK TX RESOURCE POOL SELECTION

(71) Applicant: Samsung Electronics Co., Ltd., Suwon-si (KR)

(72) Inventor: Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,227

(22) Filed: Mar. 29, 2023

(65) Prior Publication Data

US 2023/0239840 A1 Jul. 27, 2023

Related U.S. Application Data

(63) Continuation of application No. 17/248,994, filed on Feb. 16, 2021, now Pat. No. 11,627,555.

(Continued)

(51) Int. Cl.
*H04W 72/04* (2023.01)
*H04W 72/02* (2009.01)
(Continued)

(52) U.S. Cl.
CPC .......... *H04W 72/02* (2013.01); *H04L 1/1819* (2013.01); *H04W 72/56* (2023.01); *H04W 76/27* (2018.02); *H04W 80/02* (2013.01)

(58) Field of Classification Search
CPC ..... H04W 72/02; H04W 72/10; H04W 76/27; H04W 80/02; H04L 1/1819; H04L 1/1854; H04L 1/1861; H04L 5/0055; H04L 5/0064

See application file for complete search history.

(56) References Cited

U.S. PATENT DOCUMENTS 10,411,789 B2 9/2019 Loehr
10,743,155 B2 8/2020 Basu Mallick
(Continued)

FOREIGN PATENT DOCUMENTS

WO 2018008980 A1 1/2018

OTHER PUBLICATIONS

Fraunhofer HHI, R2-1912651, Resource Allocation for Mode 2 NR V2X, 3GPP TSG-RAN WG2 Meeting #107bis, Oct. 14-18, 2019 (Year: 2019).

(Continued)

*Primary Examiner* — Mahbubul Bar Chowdhury

(57) ABSTRACT

Methods and apparatuses in a wireless communication system. A method of operating a UE includes: receiving configuration information for TX resource pools including at least one of a first set of resource pools or a second set of resource pools; identifying, at an RRC sub-layer, the first and second set of resource pools based on a HARQ feedback channel; selecting, at a MAC sub-layer, a logical channel to transmit SL data, wherein the logical channel includes a highest priority among multiple logical channels using an LCP function; determining, at the MAC sub-layer, whether the logical channel is configured with the HARQ feedback channel; selecting, at the MAC sub-layer, a TX resource pool from the first set of resource pools based on a determination that the logical channel is configured with the HARQ feedback channel; and transmitting the SL data based on the TX resource pool.

16 Claims, 7 Drawing Sheets

Related U.S. Application Data

(60) Provisional application No. 62/981,110, filed on Feb. 25, 2020.

(51) Int. Cl.
  *H04W 80/02*   (2009.01)
  *H04L 1/1812*  (2023.01)
  *H04W 76/27*   (2018.01)
  *H04W 72/56*   (2023.01)

(56) References Cited

U.S. PATENT DOCUMENTS

| | | | | |
|---|---|---|---|---|
| 2014/0301353 | A1* | 10/2014 | Frenne | H04W 48/10 370/330 |
| 2017/0055265 | A1* | 2/2017 | Wei | H04W 72/0453 |
| 2018/0063878 | A1* | 3/2018 | Amerga | H04W 28/22 |
| 2019/0364541 | A1 | 11/2019 | Ryu | |
| 2020/0367095 | A1 | 11/2020 | Pan | |
| 2021/0127402 | A1 | 4/2021 | Lee | |
| 2021/0127417 | A1 | 4/2021 | Lee | |

OTHER PUBLICATIONS

Oppo, R2-1912070, Left issues on MAC for NR-V2X, 3GPP TSG-RAN WG2 Meeting #107bis, Oct. 14-18, 2019 (Year: 2019).

R2-1912651 Fraunhofer HHI, Resource Allocation for Mode 2 NR V2X, 3GPP TSG-RAN WG2 Meeting #107bis, Oct. 14-18, 2019 (Year: 2019).

International Search Report of the International Searching Authority dated Jun. 15, 2021, in connection with International Application No. PCT/KR2021/002365, 3 pages.

Ericsson, "Discussion on SL Mode 2 left issues," R2-1915378 (Resubmission of R2-1913323), 3GPP TSG-RAN WG2 #108, Reno, USA, Nov. 18-22, 2019, 5 pages.

Huawei et al., "Remaining issues on sidelink LCP procedure," R2-1913711, 3GPP TSG-RAN WG2, #107bis, Chongqing, China, Oct. 14-18, 2019, 7 pages.

Intel Corporation, "Remaining issues on sidelink configured grant design," R2-1914851, 3GPP TSG-RAN WG2 Meeting #108, Reno, US, Nov. 18-22, 2019, 5 pages.

ZTE, "Consideration on exceptional resource pool for NR V2X," R2-1909075, 3GPP TSG-RAN WG2#107, Prague, Czech Republic, Aug. 26-30, 2019, 6 pages.

Extended European Search Report dated May 19, 2023 regarding Application No. 21761598.8, 8 pages.

Ericsson, "Support of HARQ procedure over sidelink", 3GPP TSG-RAN WG2 #107bis, R2-1913327, Oct. 2019, 10 pages.

Samsung, "On Mode 1 for NR sidelink", 3GPP TSG RAN WG1 #100-e, R1-2000616, Feb. 2020, 9 pages.

Vivo (rapporteur), "Report of [105bis#33] [NR/V2X] LCP", 3GPP TSG-RAN WG2 Meeting #106, R2-1905846, May 2019, 29 pages.

* cited by examiner

SIDELINK TX RESOURCE POOL SELECTION

CROSS-REFERENCE TO RELATED APPLICATIONS AND CLAIM OF PRIORITY

This application is a continuation of U.S. patent application Ser. No. 17/248,994, filed on Feb. 16, 2021, which claims priority to U.S. Provisional Patent Application No. 62/981,110, filed on Feb. 25, 2020. The content of the above-identified patent document is incorporated herein by reference.

TECHNICAL FIELD

The present disclosure relates generally to wireless communication systems and, more specifically, the present disclosure relates to sidelink (SL) transmit (TX) resource pool selection in a vehicle-to-everything (V2X) communication.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates a SL TX resource pool selection in a V2X communication.

In one embodiment, a user equipment (UE) in a wireless communication system, the UE comprises a transceiver configured to receive configuration information for TX resource pools including at least one of a first set of resource pools or a second set of resource pools. The UR further comprises a processor operably connected to the transceiver, the processor configured to: identify, at a radio resource control (RRC) sub-layer, the first and second set of resource pools based on a hybrid automatic repeat request (HARQ) feedback channel; select, at a medium access control (MAC) sub-layer, a logical channel to transmit SL data, wherein the logical channel includes a highest priority among multiple logical channels using a logical channel prioritization (LCP) function; determine, at the MAC sub-layer, whether the logical channel is configured with the HARQ feedback channel, and select, at the MAC sub-layer, a TX resource pool from the first set of resource pools based on a determination that the logical channel is configured with the HARQ feedback channel, wherein the transceiver is further configured to transmit the SL data based on the TX resource pool.

In another embodiment, a base station (BS) in a wireless communication system, the BS comprises a transceiver configured to: transmit configuration information for TX resource pools including at least one of a first set of resource pools or a second set of resource pools; and receive SL data based on a TX resource pool determined from the first set of resource pools, wherein: the SL data is received with a logical channel including a highest priority determined, by an LCP function, from multiple logical channels, the logical channel being configured with a HARQ feedback channel associated with the first set of resource pools.

In yet another embodiment, a method of a UE in a wireless communication system, the method comprises: receiving configuration information for TX resource pools including at least one of a first set of resource pools or a second set of resource pools; identifying, at an RRC sub-layer, the first and second set of resource pools based on a HARQ feedback channel; selecting, at a MAC sub-layer, a logical channel to transmit SL data, wherein the logical channel includes a highest priority among multiple logical channels using an LCP function; determining, at the MAC sub-layer, whether the logical channel is configured with the HARQ feedback channel; selecting, at the MAC sub-layer, a TX resource pool from the first set of resource pools based on a determination that the logical channel is configured with the HARQ feedback channel; and transmitting the SL data based on the TX resource pool.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.213 v15.7.0, "NR; Physical Layer Procedures for Control"; 3GPP TS 38.215 v.15.5.0: "Physical layer measurements"; and 3GPP TS 38.214 v15.7.0, "NR; Physical Layer Procedures for Data"; 3GPP TS 38.331 v.15.7.0, "Radio Resource Control (RRC) protocol specification"; and 3GPP TR 38.885 v.16.0.0: "Study on NR Vehicle-to-Everything (V2X)."

Figure 1:
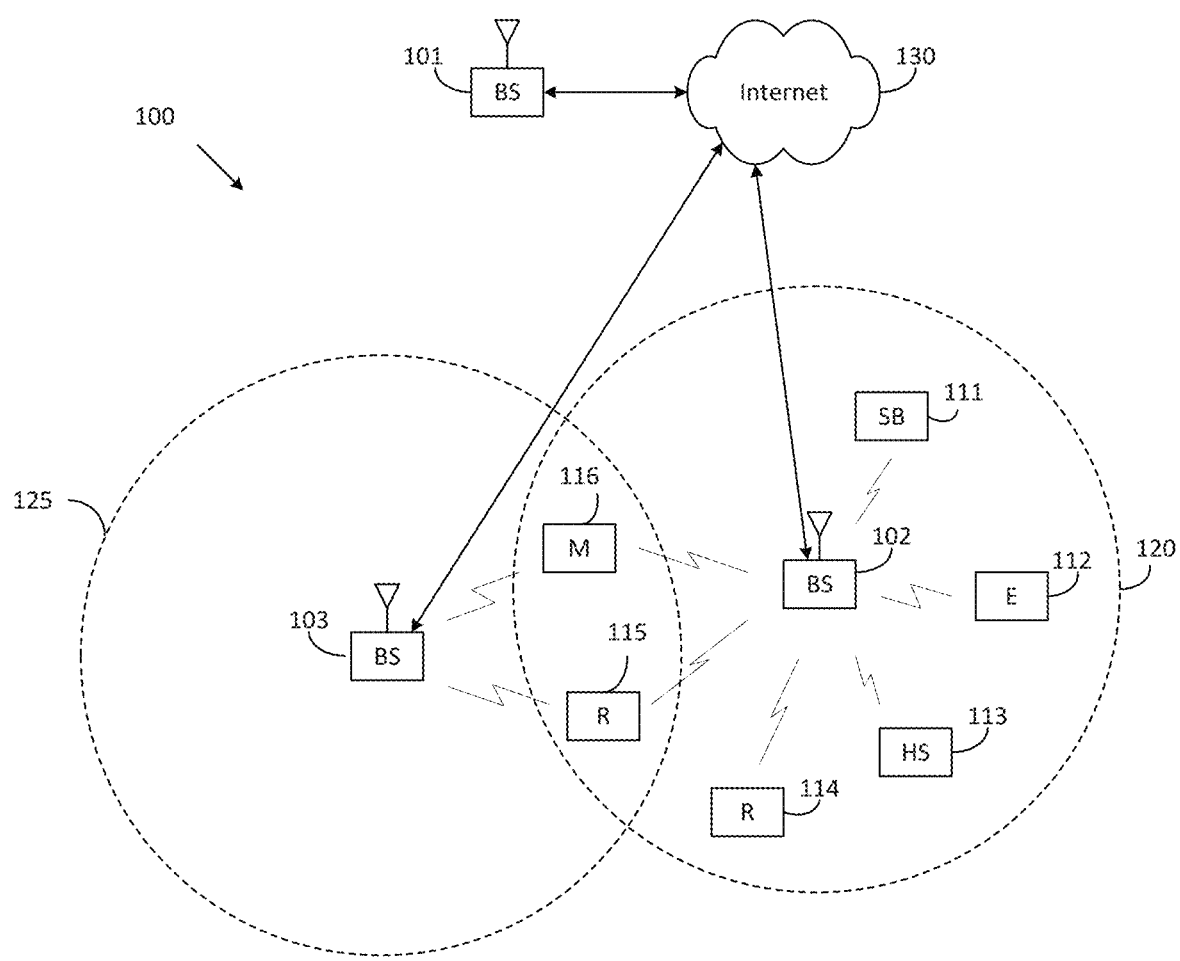
FIG. 1 illustrates an example wireless network according to embodiments of the present disclosure.
Figure 2:
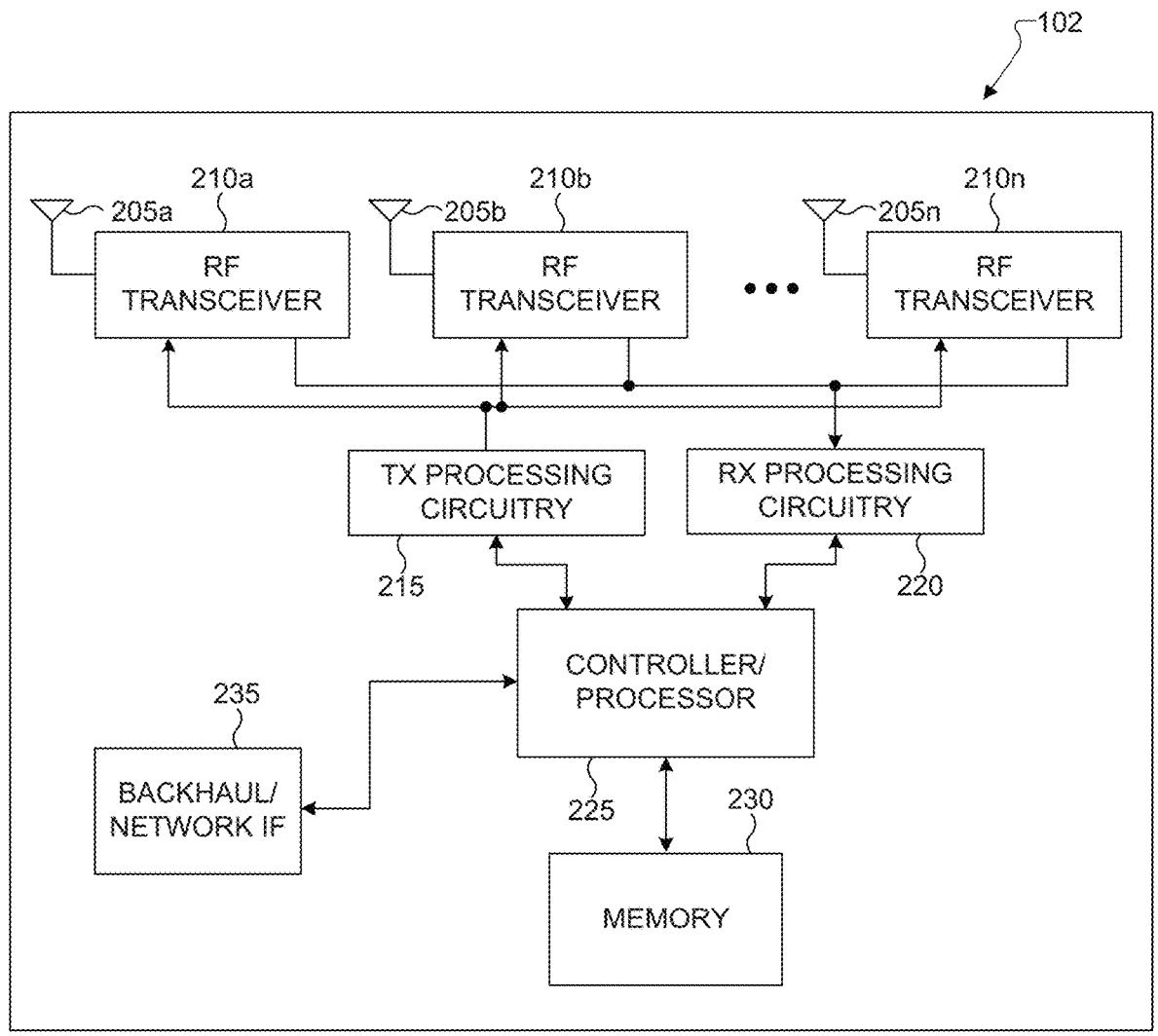
FIG. 2 illustrates an example gNB according to embodiments of the present disclosure.
Figure 3:
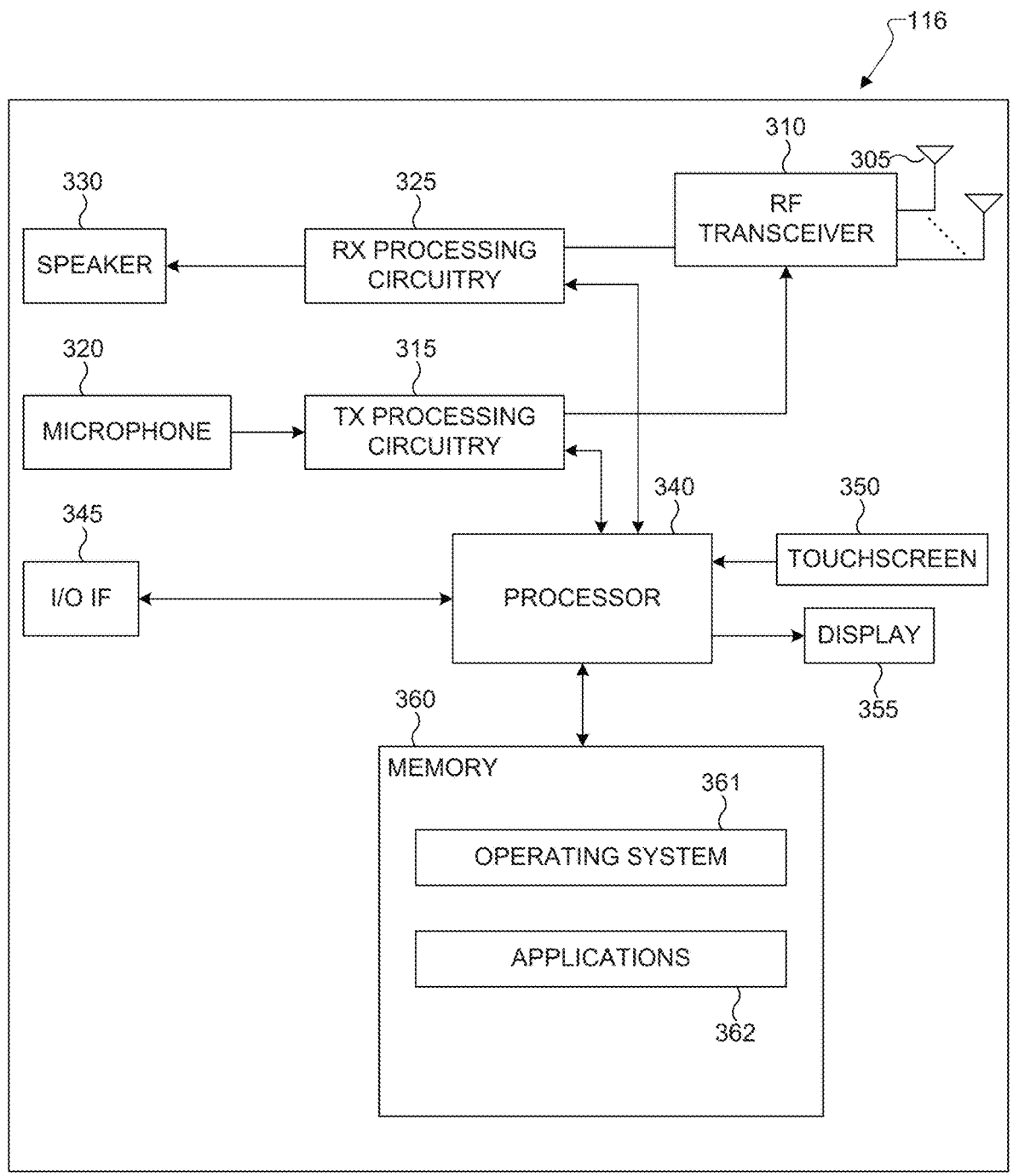
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for sidelink Tx resource pool selection. In certain embodiments, and one or more of the gNBs 101-103 includes circuitry, programing, or a combination thereof, to enable sidelink resource pools.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, TX processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as RRC signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
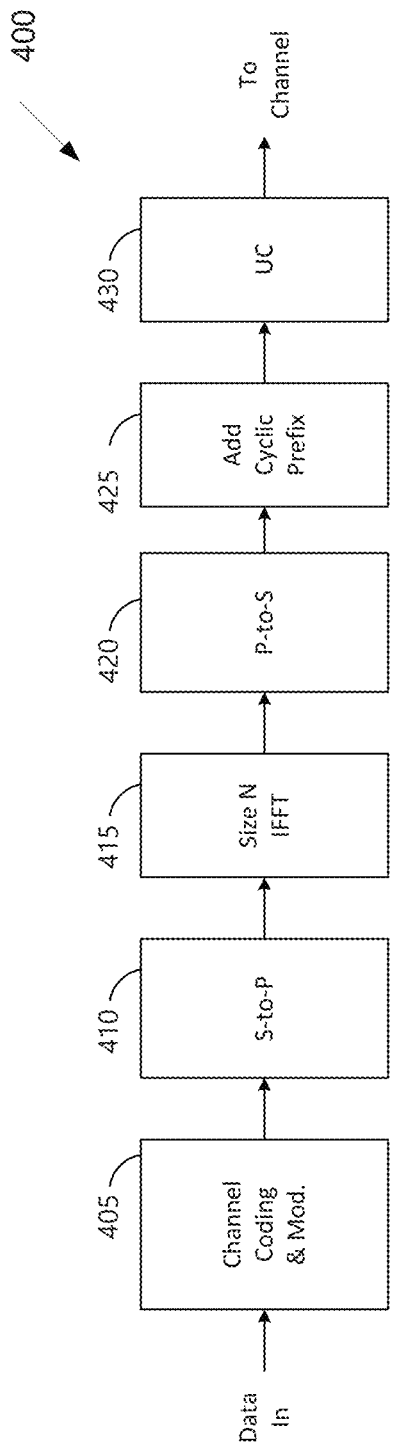
FIGS. 4 and 5 illustrate example wireless transmit and receive paths according to this disclosure.
Figure 5:
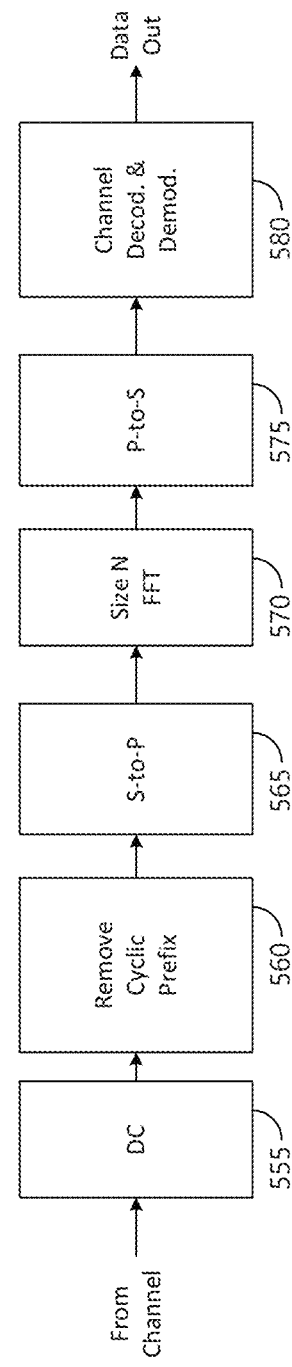

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the sidelink Tx resource pool selection as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6:
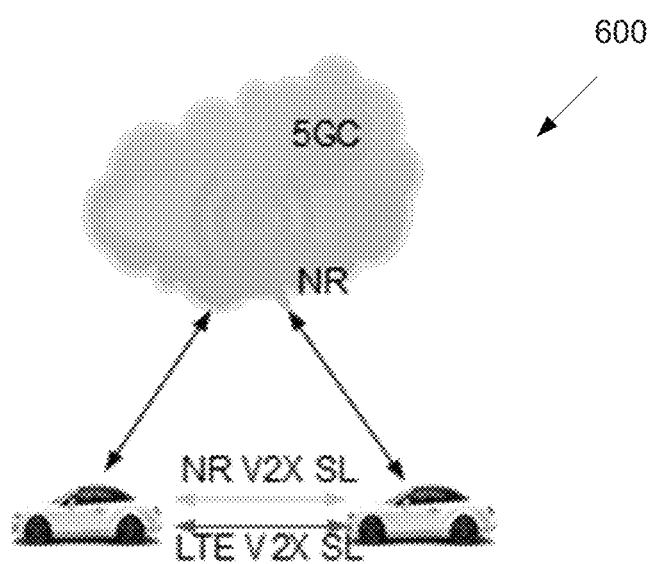
FIG. 6 illustrate an example V2X communication over sidelink according to embodiments of the present disclosure.

In 3GPP wireless communication standards, NR has been being discussed as a 5G wireless communication. One of NR features is a V2X. FIG. 6 describes the example scenario of vehicle to vehicle communication. Two or multiple vehicles can transmit and receive data/control over direct link/interface between vehicles. The direct link/interface between vehicles or between vehicle and other things is named as an SL in 3GPP. Note FIG. 6 describes the scenario where the vehicles still can communicate with a gNB in order to acquire SL resource, SL radio bearer configurations, etc., however it is also possible even without interaction with gNB, vehicles still communicate each other over SL. In the case, SL resource and SL radio bearer configuration, etc., are preconfigured (e.g., via V2X server or any other core network entity).

FIG. 6 illustrate an example V2X communication over sidelink 600 according to embodiments of the present disclosure. An embodiment of the V2X communication over sidelink 600 shown in FIG. 6 is for illustration only.

One of difference compared to uplink (UL), a link from a gNB to a UE, is the resource allocation for transmission. In UL, the resource for transmission is indicated by L1 control channel by a gNB so the UE just transmits data/control over the indicated resource. In SL, the UE itself selects a SL TX resource pool out of configured multiple resource pools and then itself selects the actual SL resource for transmission within the selected SL TX resource pool based on UE's channel sensing result and the required a number of resources for data/control transmission.

A resource pool is a set of time-frequency resources that can be used for SL transmission and/or reception. From the UE point of view, a resource pool is located inside the UE's bandwidth, within a SL bandwidth part (BWP) and has a single numerology. Time domain resources in a resource pool can be non-contiguous. Multiple resource pools can be (pre-)configured to a UE in a carrier. TX resource pool is a resource for UE's SL transmission and RX resource pool is a resource for UE's SL reception. Multiple TX resource pools can be configured by a gNB (for the UE who is interested in V2X communication in coverage of the gNB) or preconfigured by core network control/data function entity in advance (for the UE who is interested in V2X communication out of coverage of the gNB). If multiple TX resource pools are configured/preconfigured, the UE first needs to select a TX resource pool out of multiple TX resource pools. Note multiple TX resource pools can be configured via system information block (SIB), which is broadcasted in the cell by a gNB or preconfigured.

For a SL communication, the radio interface layer 2/layer 3 (L2/L3) protocols includes a MAC, radio link control (RLC), packet data convergence protocol (PDCP), RRC, and service data adaptation protocol (SDAP). A MAC protocol layer performs Layer 2 packet filtering (e.g., at least for broadcast, if it is concluded that full identification is not used in L1 control information), SL carrier/resource (re-)selection, SL HARQ transmissions without HARQ feedback and SL process, SL specific logical channel prioritization, SL scheduling request, SL buffer status reporting, and UL/SL TX prioritization. A RRC protocol layer performs reception of resource pool configurations, SL radio bearer configuration, etc., from network (e.g., a gNB or core network control/data function) and exchange of UE capabilities and SL radio bearer configurations between UEs.

If multiple TX resource pools are configured/preconfigured, in LTE V2X communication RRC selects a TX resource pool and provides the selected TX resource pool information to MAC, therefore MAC selects actual resource within the indicated TX resource pool. However, this TX resource pool selection mechanism seems not good in newly designed NR V2X communication.

In one embodiment, MAC is provided to perform TX resource pool selection dynamically based on the consequence of LCP in a multiplexing and assembly function. If RRC receives multiple TX resource pools configured/preconfigured, RRC sorts them into the TX resource pools that include the resources for HARQ feedback such as HARQ acknowledgement (HARQ-ACK) or negative acknowledgement (HARQ-NACK) information and the TX resource pools that do not include the resources for HARQ feedback information and RRC provides the sorted TX resource pools information to MAC.

Once MAC receives this information from RRC, MAC decides which SL logical channel has highest priority and the packet (data/control) to be transmitted in the transmission buffer, which means the candidate SL logical channel to be first served in the resource to be selected later. As a consequence, if the SL logical channel having the packet to be transmitted with the highest priority is configured/preconfigured with HARQ feedback, MAC selects one from the TX resource pools that include the resources for HARQ feedback information. Else if the SL logical channel having the packet to be transmitted with the highest priority is not configured/preconfigured with HARQ feedback, MAC selects one from the TX resource pools that do not include the resource for HARQ feedback information.

If there are multiple SL logical channels that have same highest priority and packet to be transmitted in the transmission buffer, MAC can randomly decide one from the multiple candidate SL logical channels. MAC needs to perform this TX resource pool selection whenever SL logical channel(s) that have the packet to be transmitted in the buffer with the highest priority is/are changed, therefore this TX resource pool selection is done in dynamic manner as the candidate logical channel to be firstly served in the MAC protocol data unit (PDU) when the resource is available.

In another embodiment, RRC is provided to select one from the TX resource pools that include the resources for HARQ feedback information and one from the TX resource pools that do not include the resources for HARQ feedback information once RRC sorted the configured/preconfigured TX resource pools into the TX resource pools that include the resources for HARQ feedback information and the TX resource pools that do not include the resources for HARQ feedback information.

Figure 7:
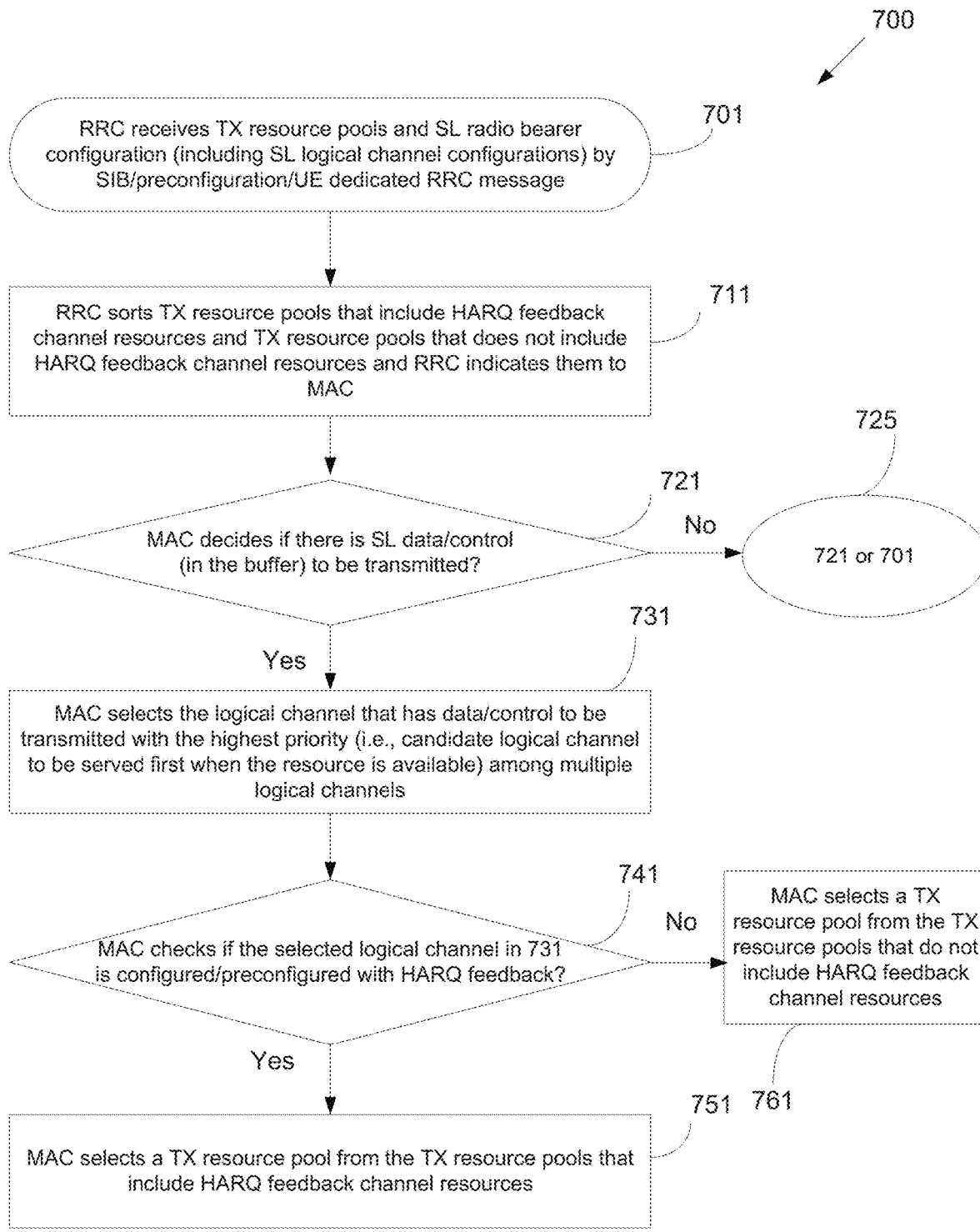
FIG. 7 illustrates a flowchart of a method of a UE for TX resource pool selection according to embodiments of the present disclosure.

Then RRC provides only selected TX resource pools (i.e., one with HARQ feedback channel resources and/or the other one without HARQ feedback channel resources) information to MAC and MAC selects one of two based on the decision of the candidate logical channel to be served first (decision criterion is same as the first example of embodiments). Note in both examples of embodiments, if RRC provides MAC only either TX resource pool(s) that include(s) the resources for HARQ feedback information or TX resource pool(s) that does not include the resources for HARQ feedback information, MAC does not need to see the candidate logical channel to be served first when the resource is available and instead MAC simply selects one of the TX resource pools indicated from RRC. In one example, RRC selects one from the configured/preconfigured TX resource pools and provides the selected TX resource pool with an indication indicating whether the selected TX resource pool includes HARQ feedback channel resources or not to MAC, and MAC selects the resource within the indicated TX resource pool. FIG. 7 illustrated UE behaviors to the aforementioned examples and embodiments.

FIG. 7 illustrates a flowchart of a method 700 of a UE for TX resource pool selection according to embodiments of the present disclosure. An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

As illustrated in FIG. 7, RRC receives TX resource pools and SL radio bearer configurations (including SL logical channel configurations) by one of an SIB, a pre-configuration, or a UE dedicated RRC message at step 701. In one example, a UE dedicated RRC message is an RRC connection reconfiguration message. Then RRC sorts the configured/preconfigured TX resource pools into the TX resource pools that include HARQ feedback channel resources and the TX resource pools that do not include HARQ feedback channel resources and indicates the TX resources to MAC at step 711.

If there is SL data/control to be transmitted in a transmission buffer, MAC selects the logical channel that has data/control data to be transmitted with the highest priority, which is candidate logical channel to be served first among multiple logical channels when the resource is available at steps 721 and 731. If there is no SL data/control data to be transmitted in the transmission buffer, either the MAC continues checking at step 721 or RRC may perform the procedure from step 701 when the TX resource pools and/or SL radio bearer configurations are changed, e.g., due to SIB update or new SIB acquisition from the serving cell change, etc., (e.g., steps 721 and 725).

If a candidate logical channel to be served first is selected at step 731, MAC checks if the selected logical channel at step 731 is configured/preconfigured with a HARQ feedback at step 741. At step 741, a checking can be done based on the corresponding SL radio bearer configuration and/or the corresponding logical channel configuration provided in step 701. If the selected logical channel is configured/preconfigured with the HARQ feedback, MAC selects a TX resource pool from the TX resources pools that include HARQ feedback channel resources provided by RRC at step 711 (e.g., at step 751).

If the multiple TX resource pools that include HARQ feedback channel resources are provided by RRC, MAC randomly selects one from TX resource pools. If the selected logical channel is not configured/preconfigured with the HARQ feedback, MAC selects a TX resource pool from the TX resource pools that do not include HARQ feedback channel resources provided by RRC at step 711 (e.g., step 761). If the multiple TX resource pools that do not include HARQ feedback channel resources are provided by RRC, MAC randomly selects one from the multiple TX resource pools.

Figure 8:
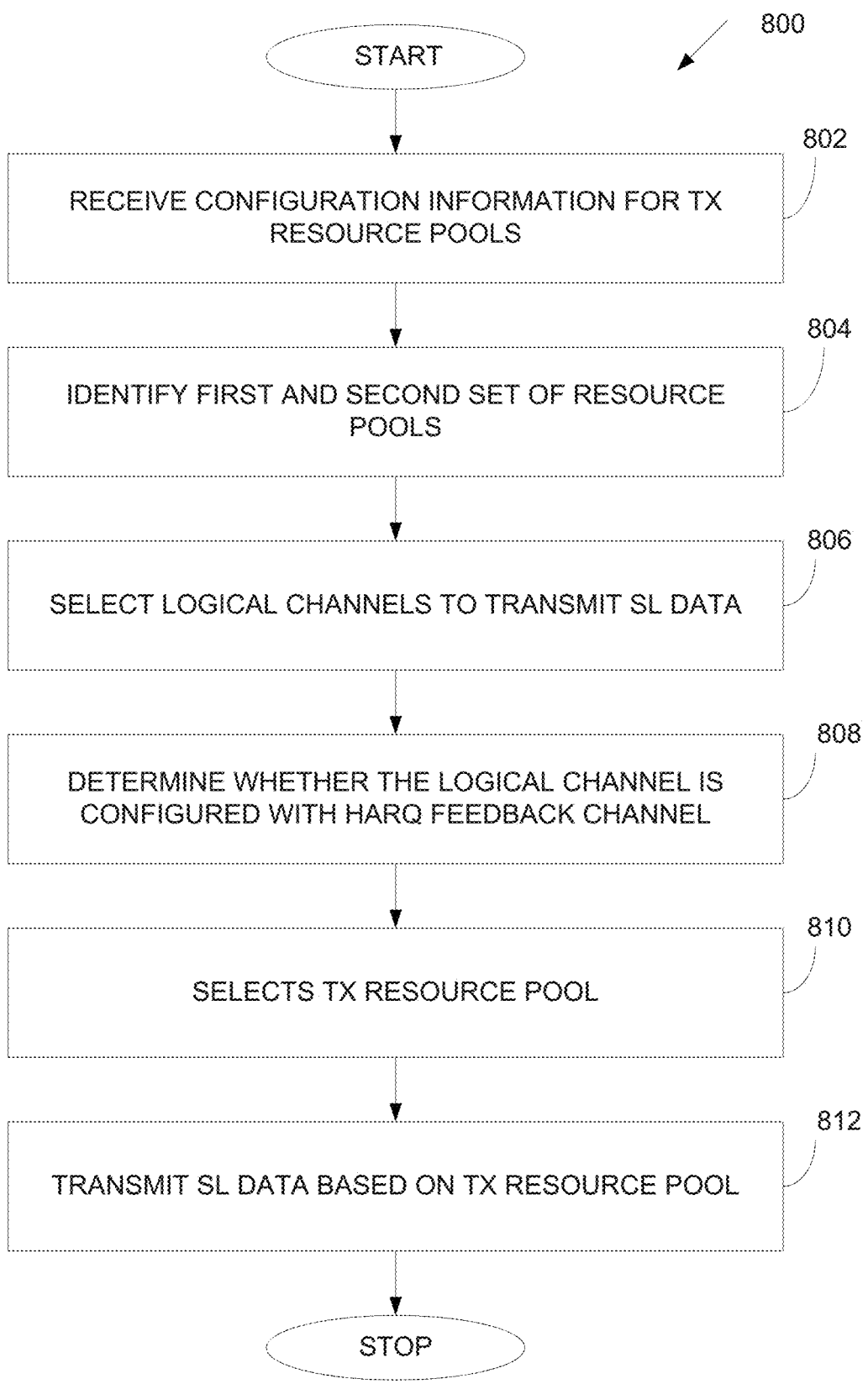
FIG. 8 illustrates a flow chart of a method for sidelink TX resource pool selection according to embodiments of the present disclosure.

FIG. 8 illustrates a flow chart of a method 800 for sidelink measurements in V2X communication according to embodiments of the present disclosure. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. The method 800 may be performed by a UE (e.g., 111 as illustrated in FIG. 1).

As illustrated in FIG. 8, the method 800 begins at step 802. In step 802, a UE receives configuration information for TX resource pools including at least one of a first set of resource pools or a second set of resource pools.

In one embodiment, the first set of resource pools includes resources for the HARQ feedback channel, and the second set of resource pools does not include resources for the HARQ feedback channel.

In step 804, the UE identifies, at an RRC sub-layer, the first and second set of resource pools based on a HARQ feedback channel.

In step 806, the UE selects, at a MAC sub-layer, a logical channel to transmit SL data, wherein the logical channel includes a highest priority among multiple logical channels using an LCP function.

In step 808, the UE determines, at the MAC sub-layer, whether the logical channel is configured with the HARQ feedback channel.

In step 810, the UE selects, at the MAC sub-layer, a TX resource pool from the first set of resource pools based on a determination that the logical channel is configured with the HARQ feedback channel.

In one embodiment, the TX resource pools are configured by a system information block (SIB); the TX resource pools are configured by a higher layer signal comprising a UE dedicated RRC message; or the TX resource pools are configured from pre-configured information.

In step 812, the UE transmits the SL data based on the TX resource pool.

In one embodiment, the UE receives SL bearer configuration information including SL logical channel configuration information.

In one embodiment, the UE selects, at the MAC sub-layer, the logical channel based on the LCP function allocating a priority to determine a transmission order of the SL data.

In one embodiment, the UE selects, at the MAC sub-layer, the TX resource pool from the second set of resource pools based on a determination that the logical channel is not configured with the HARQ feedback channel.

In one embodiment, the UE enables the RRC sub-layer of the UE, sorts the TX resource pools, at the RRC sub-layer, into the first set of resource pools and the second set of resource pools, and indicates, from the RRC sub-layer to the MAC sub-layer of the UE, that the first set of resource pools includes resources for the HARQ feedback channel, and the second set of resource pools does not include resources for HARQ feedback channel.

In one embodiment, the UE enables a MAC sub-layer of the UE; selects, at the MAC sub-layer, the logical channel to transmit the SL data; determines, at the MAC sub-layer, whether the logical channel is configured with the HARQ feedback; and selects, at the MAC sub-layer, the TX resource pool from the first set of resource pools.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
    a transceiver configured to receive, from a base station, a system information block (SIB) including configuration information for transmit (TX) resource pools, the configuration information including a first resource pool with a hybrid automatic repeat request (HARQ) feedback channel and a second resource pool without the HARQ feedback channel; and
    a processor operably connected to the transceiver, the processor configured to:
        provide, from a radio resource control (RRC) layer to a medium access control (MAC) layer, the first and second resource pools,
        select, at the MAC layer, a logical channel to transmit sidelink (SL) data with a highest priority based on a logical channel prioritization (LCP) function,
        identify, at the MAC layer, whether the logical channel is configured for HARQ feedback, and
        in case that the logical channel is configured for the HARQ feedback, select, at the MAC layer, a TX resource from the first resource pool and transmit, via the transceiver, the SL data based on the TX resource.

2. The UE of claim 1, wherein the transceiver is further configured to receive SL bearer configuration information including SL logical channel configuration information.

3. The UE of claim 1, wherein the processor is further configured to select, at the MAC layer, the logical channel based on the LCP function allocating a priority to determine a transmission order of the SL data.

4. The UE of claim 1, wherein the processor is further configured to select, at the MAC layer, the TX resource from the second resource pool based on a determination that the logical channel is not configured for the HARQ feedback.

5. The UE of claim 1, wherein the processor is further configured to enable the RRC layer of the UE to:

sort the TX resource pools into the first resource pool and the second resource pool, and indicate, to the MAC layer of the UE, that the first resource pool includes resources for the HARQ feedback channel and the second resource pool does not include resources for HARQ feedback channel.

6. The UE of claim 1, wherein the processor is further configured to enable a medium access control (MAC) layer of the UE to:

select the logical channel to transmit the SL data;
determine whether the logical channel is configured with the HARQ feedback; and
select the TX resource from the first resource pool.

7. The UE of claim 1, wherein the processor is further configured to provide, to the MAC layer, an indication indicating whether the first or second resource pool includes resources for the HARQ feedback channel.

8. A base station (BS) in a wireless communication system, the BS comprising:

a transceiver configured to transmit a system information block (SIB) including configuration information for transmit (TX) resource pools, the configuration information including a first resource pool with a hybrid automatic repeat request (HARQ) feedback channel and a second resource pool without the HARQ feedback channel, wherein sidelink (SL) data is transmitted with a logical channel including a highest priority based on a logical channel prioritization (LCP) function, wherein the logical channel is configured for HARQ feedback associated with the first resource pool, and where a TX resource on which the SL data is transmitted is from the first resource pool based on the logical channel being configured for the HARQ feedback.

9. The BS of claim 8, wherein the transceiver is further configured to receive SL bearer configuration information including SL logical channel configuration information.

10. A method of a user equipment (UE) in a wireless communication system, the method comprising:

receiving, from a base station, a system information block (SIB) including configuration information for transmit (TX) resource pools, the configuration information including a first resource pool with a hybrid automatic repeat request (HARQ) feedback channel and a second resource pool without the HARQ feedback channel;

providing, from a radio resource control (RRC) layer to a medium access control (MAC) layer, the first and second resource pools;

selecting, at the MAC layer, a logical channel to transmit sidelink (SL) data with a highest priority based on a logical channel prioritization (LCP) function;

identifying, at the MAC layer, whether the logical channel is configured for HARQ feedback; and in case that the logical channel is configured for the HARQ feedback, selecting, at the MAC layer, a TX resource from the first resource pool and transmitting the SL data based on the TX resource.

11. The method of claim 10, further comprising receiving SL bearer configuration information including SL logical channel configuration information.

12. The method of claim 10, further comprising selecting, at the MAC layer, the logical channel based on the LCP function allocating a priority to determine a transmission order of the SL data.

13. The method of claim 10, further comprising selecting, at the MAC layer, the TX resource from the second resource pool based on a determination that the logical channel is not configured for the HARQ feedback.

14. The method of claim 10, further comprising:
enabling the RRC layer of the UE:
sorting, at the RRC layer, the TX resource pools into the first resource pool and the second resource pool, and
indicating, from the RRC layer to the MAC layer of the UE, that the first resource pool includes resources for the HARQ feedback channel and the second resource pool does not include resources for HARQ feedback channel.

15. The method of claim 10, further comprising:
enabling a medium access control (MAC) layer of the UE:
selecting, at the MAC layer, the logical channel to transmit the SL data;
determining, at the MAC layer, whether the logical channel is configured with the HARQ feedback; and
selecting, at the MAC layer, the TX resource pool from the first resource pool.

16. The method of claim 10, further comprising providing, to the MAC layer, an indication indicating whether the first or second resource pool includes resources for the HARQ feedback channel.

* * * * *